June 24, 1958 M. SCOTT 2,840,688
STRAP OPERATED BACK-UP LAMP FOR AUTOMOBILES
Filed April 11, 1957
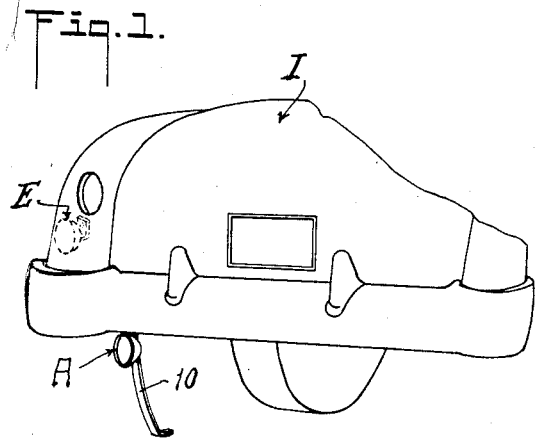
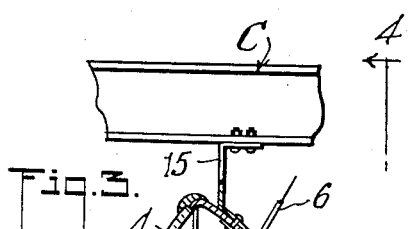
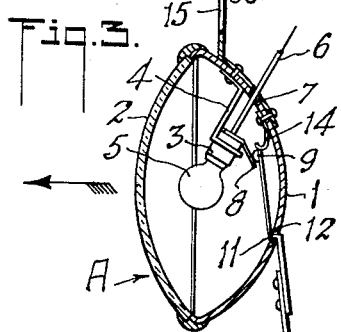
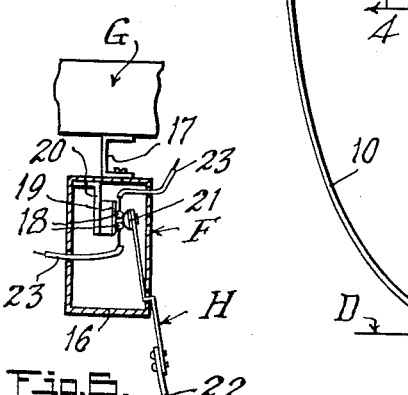
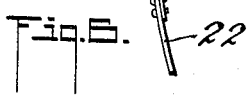
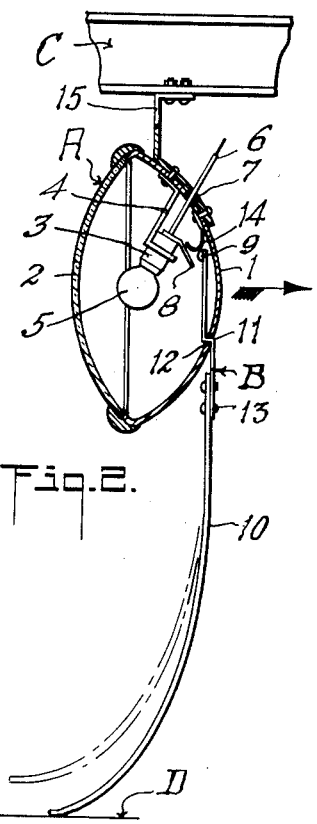
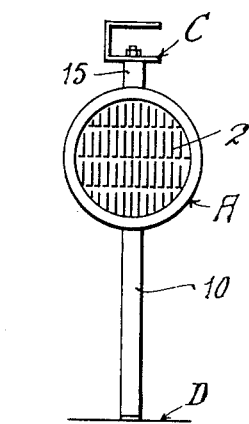
INVENTOR.
MARTIN SCOTT
BY
*Harry B. Cook,*
ATTORNEY

United States Patent Office 2,840,688
Patented June 24, 1958

2,840,688

STRAP OPERATED BACK-UP LAMP FOR AUTOMOBILES

Martin Scott, Valhalla, N. Y.

Application April 11, 1957, Serial No. 652,171

2 Claims. (Cl. 240—8.3)

This invention relates in general to switch-operating devices and more particularly the invention is directed to the provision of operating mechanism for a back-up lamp of the type that is mounted on the rear end of an automobile.

Known back-up lamps or signals are usually controlled by a switch mounted on the forward end of the vehicle and actuated either by the shifting lever or directly manually by the driver of the vehicle. Such combinations of signal or back-up lamps and switch operating mechanisms are complicated, expensive and require care and much time for installation.

A prime object of the present invention is to provide a combination of a signal or back-up lamp for an automobile and a switch therefor which shall be simple and inexpensive in construction and easy to install.

Another object is to provide such a combination embodying novel and improved features of construction such that the operation of the switch shall be wholly dependent upon movement of the vehicle as contrasted with movement by a shifting lever of the automobile or by manual operation of the switch.

A further object of the invention is to provide a switch to be mounted on a movable body such as an automobile chassis in combination with a flexible actuating member such as a strap having one end connected to the switch and its other end in frictional contact with the ground or other surface over which the body is moved, whereby drag on the flexible actuating member will operate the switch in opposite directions dependent upon the direction of movement of said body or vehicle chassis.

Still another object is to provide in a switch operating mechanism of this character a flexible actuating member which shall be normally elevated out of contact with the ground by the force of the air currents incident to movement of said body or vehicle chassis, thereby preventing excessive wear of the actuating member.

Another object of the invention is to provide a back-up lamp or signal having an actuating switch mounted therein so that the lamp and the switch can be handled as a unit.

Other objects are to provide a switch operating mechanism of this character wherein said flexible actuating member shall also serve to conduct static electric charges from the vehicle to the ground, and to obtain other advantages and results that will be brought out by the following description in conjunction with the accompanying drawings in which Figure 1 is a fragmentary perspective view of the rear end of an automobile having mounted thereon a combined back-up lamp and switch embodying the invention;

Figure 2 is a greatly enlarged central vertical sectional view through the lamp casing, showing the lamp and the switch in elevation with the switch in open position during forward movement of the vehicle;

Figure 3 is a similar view showing the switch in closed position during backward movement of the vehicle;

Figure 4 is an elevational view of the rear of the lamp, on a reduced scale, taken from the plane of the line 4—4 of Figure 3;

Figure 5 is an elevational view of the front of the lamp; and

Figure 6 is a fragmentary central vertical sectional view of a modification of the invention wherein the switch is separate from the lamp casing.

Specifically describing the embodiment of the invention illustrated in Figures 1–5 inclusive, the reference character A designates a lamp housing of the usual form including a cup-shaped metallic bottom or rear section 1 and a transparent front or lens section 2. The housing also serves as a support for the combined lamp and switch. An incandescent lamp is mounted in any suitable manner in the housing, but as shown, a lamp socket 3 is mounted within the casing on a bracket 4 and has an incandescent lamp 5 of the usual type fitted therein in the usual way. A conducting wire 6 extends from one terminal of the socket outwardly through an opening 7 in the casing for connection in a suitable circuit such as the usual tail lamp circuit of an automobile. The other terminal of the socket has a stationary switch contact member 8 connected thereto but insulated from the lamp housing. A switch lever B is pivotally mounted in the lamp housing A in any suitable manner and carries a contact member 9 at one end thereof while at the other end of the lever and exteriorly of the lamp housing is connected a flexible actuating member 10 that is shown in the form of a flat strap. More particularly, the switch lever B is shown as comprising a single piece of rigid strap material having an intermediate portion 11 thereof disposed approximately perpendicularly to the end portions and bearing on the edges of an opening 12 in the housing section 1 with the contact member 9 juxtaposed to the fixed contact member 8 and the other end of the lever riveted as at 13 to one end of the strap 10. With this construction, the lever B may swing in opposite directions to cause engagement and disengagement, respectively, of the contact members 8 and 9. Preferably, a spring 14 is mounted in the housing so as to yieldingly hold the contact member 9 in engagement with the contact member 8 as shown in Figure 3 and also yieldingly hold said contact member 9 out of engagement with the contact member 8 as shown in Figure 2, the contact member moving past the spring 14 with a snap action from one position to the other.

The strap 10 is foldably flexible and may be formed of any suitable material such as that commonly utilized at the present time in ground straps for automobiles, for example fabric or leather.

In use, the lamp housing is mounted on a movable body C such as the chassis of an automobile I by a hanger bracket 15, with the lower end of the flexible actuating member 10 in dragging contact with the roadway or other surface D over which the vehicle or other body carrying the lamp is moved. Of course, when the lamp is serving as a back-up lamp, it will be located on the rear end of the vehicle as shown in Figure 1 with the lens 2 facing toward the rear. Upon movement of the body or chassis C in one direction or forwardly as indicated by the arrow in Figure 2, the frictional drag of the actuating member 10 on the roadway or other surface D will cause the lever B to be swung in the direction to disengage the contact member 9 from the contact member 8 to open the circuit through the lamp 5, and when the body or chassis C is moved in the other direction or rearwardly as indicated by the arrow in Figure 3, the drag on the strap will cause the lever B to swing in the other direction and move the contact member 9 into engagement with the contact member 8 to close the circuit through the lamp 5.

When the body or chassis C is moving at relatively high speeds the air currents incident to such movement impinging upon the flat surface of the actuating member 10 will cause the free end of the actuating member to swing upwardly out of contact with the surface D as indicated by dot and dash lines in Figure 2; and when the actuating member is in contact with the ground it will conduct static electricity from the body or chassis to the ground.

In some cases it may be desirable to provide the lamp and switch in separate casing so that, for example, the lamp might be mounted at a high point or on a wheel fender of an automobile as indicated by the broken lines E in Figure 1 and the switch can be mounted on the underside of the chassis. In Figure 6, the switch F is separated from the lamp housing and comprises a support or casing 16 suspended from the vehicle chassis or other body G by a bracket 17. The switch may be of any suitable construction but for the purpose of illustration I have shown two fixed contacts 18 spaced apart on a block of insulation 19 which is suspended in the casing by a bracket 20, and cooperating with the switch contact members 18 is a movable contact member 21 of a size to simultaneously engage both of the contacts 18 to close the circuit therebetween. The movable contact 21 is carried by a switch operating lever H that may be substantially identical with the lever B and has connected thereto a fluexible actuating member 22 that may be identical with the actuating member 10. Obviously, upon movement of the body or chassis G in one direction with the actuating member 22 in contact with the surface over which the body or chassis G moves, the contact member 21 will be actuated out of engagement with the contact member 18 to open the circuit, while upon movement of the body or chassis in the opposite direction the contact member 21 will be actuated into engagement with both of the contact members 18 to close the circuit, it being understood that the contacts 18 will be connected by wires 23 in circuit with a lamp or other signal.

If desired, an additional manually operated switch could be included in the circuit with the back-up lamp to shut off the back-up lamp in case the automobile should be parked immediately after backing thereof and thus leave the switch 8, 9 in circuit closing position.

It will be understood by those skilled in the art that the details of construction of the lamp, switch and switch-operating mechanism may be changed and that the invention may be embodied in other switches and electrical devices, all within the spirit and scope of the invention.

What I claim is:

1. A back-up lamp for automobiles comprising a housing, means for mounting the housing on an automobile, an electric lamp mounted in the housing, a switch including relatively movable contact members, a lever pivotally mounted in said housing and upon which is mounted one of said contact members for movement into and out of engagement with the other upon swinging of said lever in opposite directions respectively, said housing having an opening and one end portion of said lever projecting out of the housing through said opening, and a flexibly foldable strap having one end connected to said end portion of said lever and its other end portion to frictionally drag on a surface along which said automobile travels, said strap having a weight and frictional characteristics such as to react with customary traveling surfaces to move the lever sufficiently to operate the switch when the automobile is set into motion.

2. A back-up lamp for automobiles comprising the combination with an electric lamp of a housing, means for mounting the housing on an automobile, a switch controlling said lamp and including relatively movable contact members mounted in said housing, means including a lever in said housing for causing relative movement of said contact members into and out of mutual contact upon swinging of said lever in opposite directions, respectively, and means for swinging said lever in one direction upon rearward movement of the automobile and in the other direction upon forward movement of the automobile, including a flexible foldable strap having one end connected to said lever and its other end portion to frictionally drag on a surface along which said automobile travels, said strap having a weight and frictional characteristics such as to react with customary traveling surfaces to move the lever sufficiently to operate the switch when the automobile is set into either rearward or forward motion.

References Cited in the file of this patent

UNITED STATES PATENTS

| | | |
|---|---|---|
| 1,550,171 | Kelly | Aug. 18, 1925 |
| 1,611,749 | Himmelman | Dec. 21, 1926 |
| 2,214,685 | Stone | Sept. 10, 1940 |
| 2,344,685 | Eshbaugh | Mar. 21, 1944 |
| 2,658,967 | Matschke | Nov. 10, 1953 |
| 2,686,252 | Geraci | Aug. 10, 1954 |